Oct. 13, 1942.   V. T. MALCOLM   2,298,397
METHOD OF TREATING METAL
Filed Oct. 18, 1939
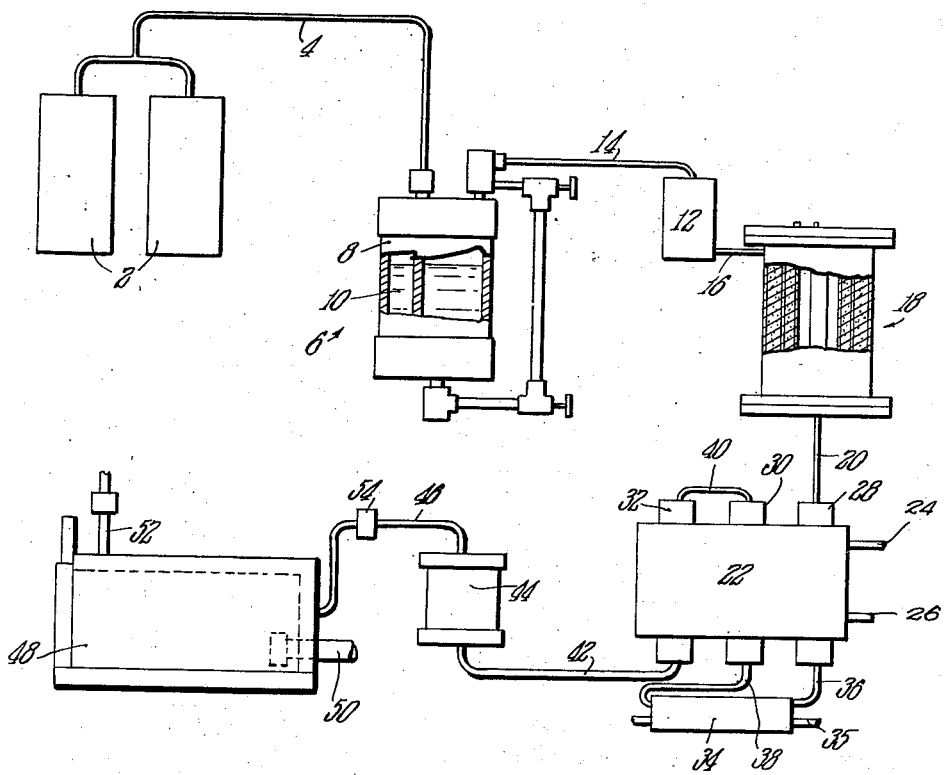
INVENTOR.
Vincent T. Malcolm.
BY Walter C. Ross.
ATTORNEY.

Patented Oct. 13, 1942

2,298,397

UNITED STATES PATENT OFFICE 2,298,397

METHOD OF TREATING METAL

Vincent T. Malcolm, Indian Orchard, Mass., assignor to The Chapman Valve Manufacturing Co., Indian Orchard, Mass., a corporation of Massachusetts Application October 18, 1939, Serial No. 300,000

3 Claims. (Cl. 148—16)

This invention relates to improvements in apparatus for and methods of treating metal and the product thereof.

The principal objects of the invention are directed to the provision of an apparatus for and method of treating metals whereby they are hardened yet rendered scale-free. More particularly the invention relates to the production of hardened carbon-containing steels which are substantially free from scale and the treatment, as will appear, is capable of being readily and economically carried out.

Various other novel features and advantages of the invention will be hereinafter more fully referred to in connection with the accompanying description of the preferred form of the invention, reference being had to the drawing, wherein the figure is a more or less diagrammatic plan view showing one form of apparatus for carrying out the novel features of the invention.

The apparatus to be employed for the invention may be varied within wide limits in order to attain the objects of the invention without departing from the spirit and scope thereof. In its broad aspects, however, the process consists of passing ammonia gas through various units and into a furnace containing the metal being treated, which gas expels air from the furnace and prevents contact of air with the steel. As will appear the steel is unconfined within the furnace.

Means for supplying ammonia gas may include one or more tanks such as 2 and the gas is conducted therefrom through a suitable conduit 4 to and through a scrubbing unit such as 6. Said unit preferably consists of a closed container 8 containing a liquid 10.

The gas passes through the liquid 10 and into a dryer unit 12 as by means of a conduit 14. The liquid 10 may consist of any suitable substance adapted to scrub the ammonia gas such as, for example, benzol.

The dryer 12 consists of a closed container having therein some substance adapted to pick up moisture such as calcium chloride, phosphorous pentoxide or the like. From dryer, as by conduit 16, the gas passes into and through a cracking unit 18.

Said unit 18 may be like that shown in my United States Letters Patent No. 2,131,709 and it will be adapted to disassociate the hydrogen and nitrogen constituents of the ammonia. To accomplish this, heat may be provided in the unit to a temperature of about 1200° F.

From the cracking unit 18, the gas passes through a conduit 20 to a catalyst furnace indicated generally by 22. This furnace is heated in some suitable manner, as by electrical heating elements 24 and 26 and it includes a plurality of tubes, such as indicated by 28, 30, 32, and 34, all interconnected in some manner as by conduits 36, 38 and 40.

Tube 28 may contain suitable material for absorbing water vapor, such as powdered tungsten, and the tube 30 may contain powdered silicon or magnesium. In tube 32 there is preferably powdered chromium or silicon, while in tube 34 there may be alumina.

In any event, as the disassociated elements of the ammonia gas pass from tube to tube, the water vapor is picked up and the hydrogen constituent is activated. From the last tube 34, the elements pass through conduit 42 to an ionizer unit 44.

This last-named unit preferably takes the form of that shown in my United States Letters Patent No. 1,975,063 and is adapted, by means of an electric discharge, to ionize or activate the hydrogen constituent of the ammonia gas. From this unit, the elements pass through conduit 46 to a furnace 48.

Some suitable heating means, such as an electrical heating unit indicated by 35, is preferably associated with tube 34. Obviously other means of supplying heat thereto could be employed.

The furnace may be heated in various ways as by fuel delivered through a nozzle 50, or electricity. There is also preferably provided in the furnace a vent such as 52 to the atmosphere.

The furnace 48 is such that the gas constituents may completely blanket the work contained therein and the work is purposely not confined. I maintain a constant flow of the gases into the furnace under such pressure that all air is replaced and the unconfined steel is heated without causing scale.

It is desirable that the flow of gases be controlled in some suitable manner so that complete expelling of air is assured. Any desired flow meter or pressure gauge, such as a manometer indicated by 54, may be employed for this purpose.

It will be appreciated that the activated gas is in actual contact with the work since it completely blankets it and since the work is unconfined. The temperatures of the furnaces may vary widely depending upon the type of metal being treated and the result desired, but I have found that a temperature of around 1200° F.

in the catalyst furnace and one that is above the critical point of the steel being hardened, around 1200° to 1800° F., in the final treating furnace produces suitable results. The temperature prevailing in the cracking unit may well be somewhat like that in the catalyst unit.

When operated at such temperatures and controlling the flow of gases into the furnace 48 in the manner described, the steels are efficiently heat treated without producing scale usually encountered in operating with ordinary atmospheres.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, rather than by the foregoing description, and all changes which come within the meaning and range of equivalency of the claims are therefore intended to be embraced therein.

What it is desired to claim and secure by Letters Patent of the United States is:

1. The process of providing a piece of hardened, scale-free metal which consists in, placing a piece of hardenable carbon-containing metal into an open furnace of such a character that said piece may be quickly removed therefrom, then leading activated gas into the furnace under such controlled conditions that substantially all air is expelled from the furnace and the piece is blanketed by the gas and simultaneously heating the piece to a temperature above the critical transformation point of the metal, and then rapidly removing the piece from the furnace and rapidly cooling it.

2. The process of providing a piece of hardened, scale-free metal which consists in, placing a piece of hardenable carbon-containing metal into an open furnace of such a character that said piece may be quickly removed therefrom, leading ammonia gas through a unit capable of disassociating the gas into its hydrogen and nitrogen constituents while maintaining a temperature in said unit of about 1200° F. and then leading said constituents into said furnace under such controlled conditions that substantially all air is expelled from the furnace and the piece is blanketed by said constituents and simultaneously heating the piece to a temperature above the critical transformation point of the metal, and then rapidly removing the piece from the furnace and rapidly cooling it.

3. The process of providing a piece of hardened, scale-free metal which consists in, placing a piece of hardenable carbon-containing metal into an open furnace of such a character that said piece may be quickly removed therefrom, leading ammonia gas successively through scrubbing, drying, and cracking units so as to disassociate the gas into its hydrogen and nitrogen constituents, and then leading said constituents into said furnace under such controlled conditions that substantially all air is expelled from the furnace and the piece is blanketed by said constituents and simultaneously heating the piece to a temperature above the critical transformation point of the metal, and then rapidly removing the piece from the furnace and rapidly cooling it.

VINCENT T. MALCOLM.